(12) United States Patent
Khalid et al.

(10) Patent No.: US 6,675,257 B1
(45) Date of Patent: Jan. 6, 2004

(54) SYSTEM AND METHOD FOR MANAGING STORAGE SPACE ON A SEQUENTIAL STORAGE MEDIA

(75) Inventors: ATM Shafiqul Khalid, Bellevue, WA (US); Ravisankar Pudipeddi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 231 days.

(21) Appl. No.: 09/607,505

(22) Filed: Jun. 28, 2000

(51) Int. Cl.[7] ............................................. G06F 12/08
(52) U.S. Cl. .................. 711/111; 711/112; 711/159; 711/160; 707/203; 707/206
(58) Field of Search .................. 711/111, 112, 159, 711/160; 707/206, 203, 201, 202, 204, 205

(56) References Cited

U.S. PATENT DOCUMENTS

| | | | | |
|---|---|---|---|---|
| 5,530,850 A | * | 6/1996 | Ford et al. | 707/206 |
| 5,933,847 A | * | 8/1999 | Ogawa | 711/103 |
| 6,094,664 A | * | 7/2000 | Ungar | 707/206 |
| 6,098,089 A | * | 8/2000 | O'Connor | 709/104 |

* cited by examiner

*Primary Examiner*—Kevin L. Ellis
*Assistant Examiner*—Midys Inoa
(74) *Attorney, Agent, or Firm*—Law Offices of Albert S. Michalik, PLLC

(57) ABSTRACT

A system and method store information to a sequential storage media such that storage space occupied-by data deemed obsolete may be reclaimed. Information may be written to the storage media as sequential data sets with each data set including a catalog describing the information in the data set. A reclamation catalog identifies the obsolete data stored on the media and is written to the media. A generation number on the storage media may indicate whether the storage media has been reclaimed. A reclamation process transfers data from the source media (e.g., the tape media that includes obsolete data) to a destination media (e.g., a blank tape) while excluding the obsolete data identified in the reclamation catalog. The reclamation process may read a catalog stored on the source media that describes the data stored on the source media. The reclamation process then modifies that catalog by the information stored in the reclamation catalog to create a unified catalog. The unified catalog identifies which of the data stored on the source media is to be copied to the destination media. The reclamation process then copies the data identified in the unified catalog to the destination media. The reclamation process may additionally increment the generation number to indicate that the storage media has been reclaimed.

26 Claims, 11 Drawing Sheets

| Offset | | Field Name | Type | Size |
|---|---|---|---|---|
| 0 | 00h | DBLK Type | UINT32 | 4 bytes |
| 4 | 04h | Block Attributes | UINT32 | 4 bytes |
| 8 | 08h | Offset To First Event | UINT16 | 2 bytes |
| 10 | 0Ah | OS ID | UINT8 | 1 byte |
| 11 | 0Bh | OS Version | UINT8 | 1 byte |
| 12 | 0Ch | Displayable Size | UINT64 | 8 bytes |
| 20 | 14h | Format Logical Address | UINT64 | 8 bytes |
| 28 | 1Ch | Reserved for MBC | UINT16 | 2 bytes |
| 30 | 1Eh | Reserved | - - - | 6 bytes |
| 36 | 24h | Control Block ID | UINT32 | 4 bytes |
| 40 | 28h | Reserved | - - - | 4 bytes |
| 44 | 2Ch | OS Specific Data | MTF_TAPE_ADDRESS | 4 bytes |
| 48 | 30h | String Type | UINT8 | 1 byte |
| 49 | 31h | Reserved | - - - | 1 byte |
| 50 | 32h | Header Checksum | UINT16 | 2 bytes |

SYSTEM AND METHOD FOR MANAGING STORAGE SPACE ON A SEQUENTIAL STORAGE MEDIA

FIELD OF THE INVENTION

The present invention relates to electronic information storage. More specifically, the invention relates to the storage of electronic information on non-volatile sequential media.

BACKGROUND OF THE INVENTION

Tape media and other sequential storage media provide storage for important information. However, due to the technology used in recording information on the sequential storage media, overwriting specific portions of already recorded information is not permitted. As a result, a piece of tape media may contain obsolete data along with current data, and over time, the obsolete data may occupy a significant part of the media. The storage space dedicated to the obsolete data vastly increases the maintenance costs of the tape media storage. For instance, more pieces of tape media than necessary are required to store an entity's data, which requires more tape media, increased physical storage locations, and additional mechanisms or manual intervention by administrators to access the additional tape media.

Until now, there has not been any manageable way to decrease the amount of tape media necessary for maintaining important information on the media.

SUMMARY OF THE INVENTION

The present invention provides a system and method for storing information to a sequential storage media such that storage space occupied by data deemed obsolete may be reclaimed. To that end, information is written to the storage media as sequential data sets with each data set including a catalog describing the information in the data set.

In accordance with one aspect of the invention, a new catalog type (a reclamation catalog) is provided that identifies the obsolete data stored on the media. The reclamation catalog may be written to the media periodically to identify data already stored on the media that has become obsolete. The reclamation catalog may be written to the media in association with a null data set if necessary to conform with storage conventions.

In accordance with another aspect of the invention, a reclamation process transfers data from the source media (e.g., the tape media that includes obsolete data) to a destination media (e.g., a blank tape) while excluding the obsolete data identified in the reclamation catalog. The reclamation process may read a catalog stored on the source media that describes the data stored on the source media. The reclamation process then modifies that catalog with the information stored in the reclamation catalog to create a unified catalog. The unified catalog identifies which of the data stored on the source media is to be copied to the destination media. The reclamation process then copies the data identified in the unified catalog to the destination media. In that manner, the destination media contains only valid data, and the source tape may be erased and reused.

In accordance with still another aspect of the invention, a generation number may be associated with the storage media that identifies whether a reclamation process has been performed with respect to the storage media. An application that maintains its own information describing data objects stored on the storage media may update its own information if the generation number stored on the storage media is inconsistent with its own information. For instance, the information maintained by the application may be associated with a generation number-of two (2). If the application determines that the storage media now includes a generation number of three (3), the application may update its own information to reflect that a reclamation has occurred. More specifically, the application may update its own information in accordance with a mapping catalog that maps data objects stored on the storage media to a location of the data objects as they were stored on the older generation of the storage media.

These and other aspects of the invention, together with the benefits and advantages realized, will become apparent from a reading of the following detailed description in conjunction with the drawings, in which:

BRIEF DESCRIPTION OF THE DRAWINGS

FIG. 5 is a table representing a common block header within the start of set descriptor block used by the illustrative storage management system implementing the present invention;

DETAILED DESCRIPTION

Exemplary Operating Environment

Figure 1:
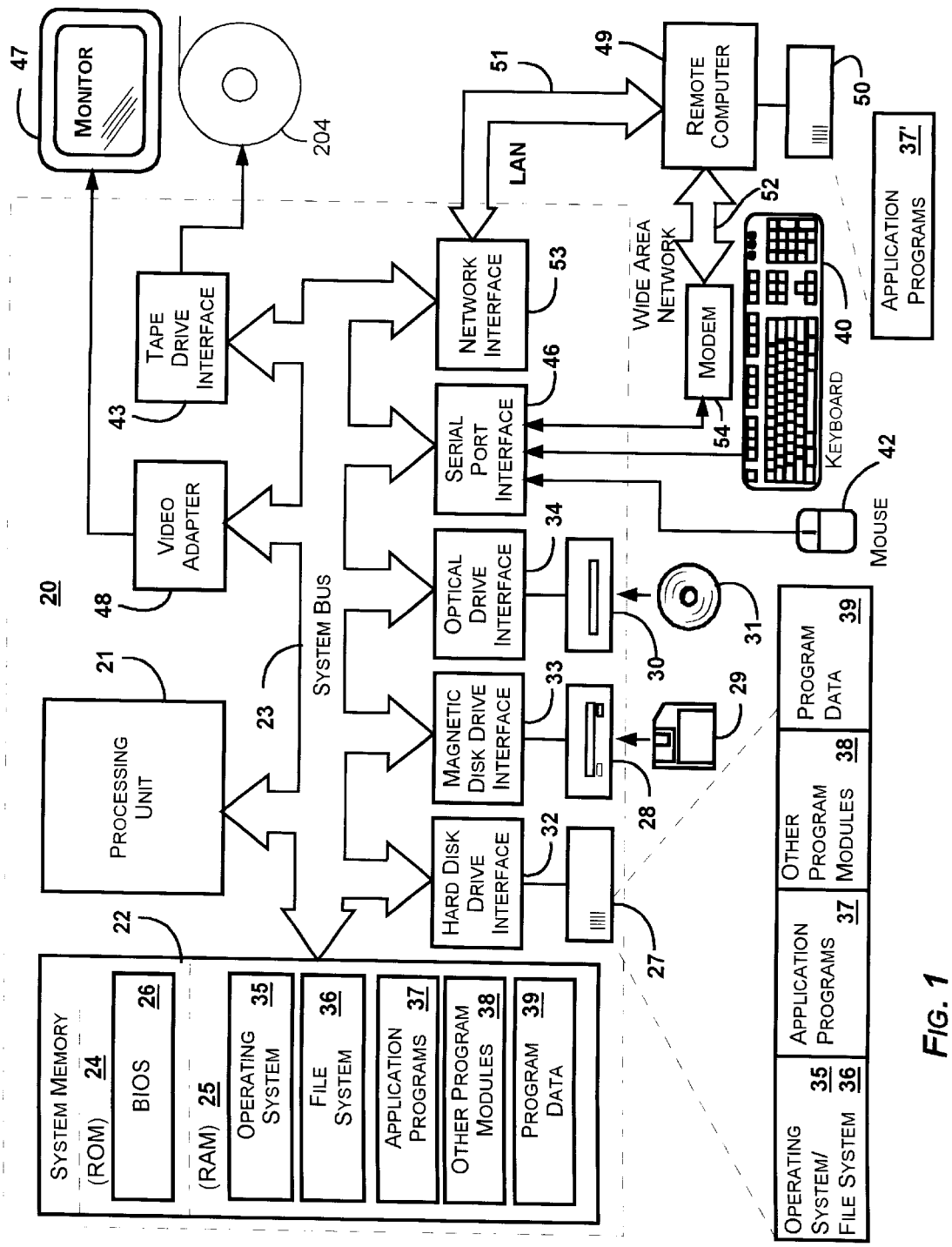
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. In addition, a tape drive interface 43 may be connected to the system bus 23 and be used to read from and write to a magnetic tape 204. The drives and their associated computer-readable media provide non-volatile storage of computer readable instructions, data structures, program modules and other data for the personal computer 20. Although the exemplary environment described herein employs a hard disk, a removable magnetic disk 29, a removable optical disk 31, and a tape 204, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, tape 204, ROM 24 or RAM 25, including an operating system 35 (preferably the Windows® 2000 operating system). The computer 20 includes a file system 36 associated with or included within the operating system 35, such as the Windows NT® File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Illustrative Storage Management System

Figure 2:
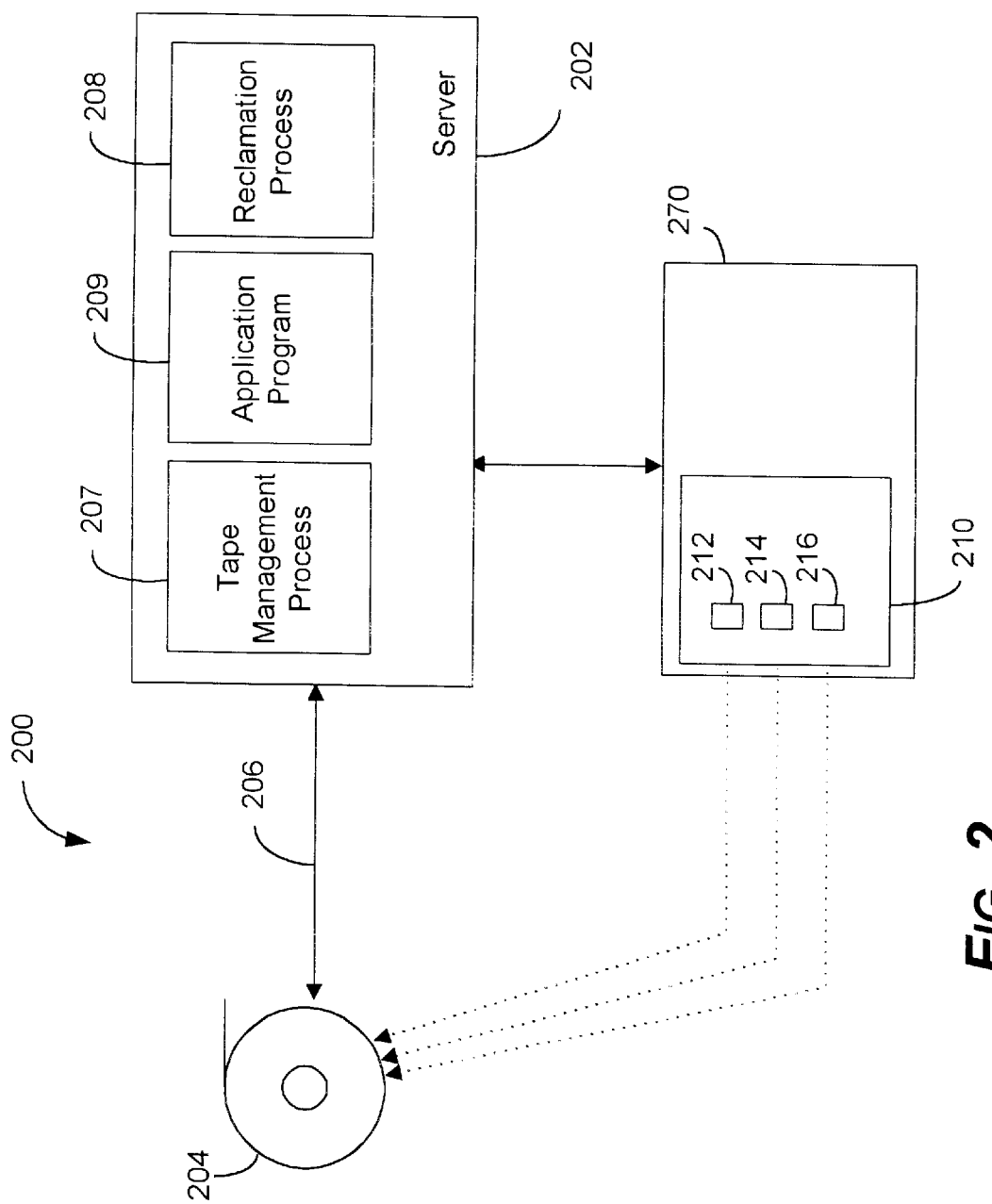
FIG. 2 is a functional block diagram generally illustrating an illustrative storage management system constructed in accordance with one implementation of the present invention.

FIG. 2 is a functional block diagram that, together with the following discussion, provides a brief, general description of an illustrative system for managing storage space on a sequential storage media. The sequential storage media includes any form of magnetic tapes (e.g., QIC, 4 mm DAT, 8 mm, DLT, and the like). As used herein, the term "tape" is used for simplicity of discussion, and is intended to encompass sequential storage media of all types, and is not limited to those just mentioned. The storage management system 200 includes a server 202, which may be a computing system as described in FIG. 1, coupled to a tape 204 via a tape drive interface 206 that connects to the system bus of the server 202.

The server 202 includes a tape management process 207 for controlling accesses to the tape 204, and also includes an application program 209, such as a database application or the like. The application program 209 may store data or other files on a hard disk 270, and may additionally store application specific metadata 210 on the hard disk 270. The application specific metadata 210 may include stubs 212, 214, 216 that reference a location on the tape 204 at which a specific file (e.g. data object) associated with the application program 209 may be found. The application program 209 reads its data by accessing a stub (e.g., stub 212) which points to a particular data block on tape 204. In response, the tape management process 207 may retrieve from the tape 204 the data block pointed to by stub 212, and pass that data to the application program 209.

According to one aspect of the present invention, briefly described here and described in detail below, the application program 209 may identify obsolete files on the tape 204 by writing a reclamation catalog (illustrated in FIG. 3 and described below) to the tape 204. The reclamation catalog specifies the data objects on the tape 204 that are obsolete (e.g., no longer valid or wanted). The application program 209 may periodically write the reclamation catalog to the tape 204 to identify data that has become obsolete since the last data management operation. For example, when a database application updates a database file on hard disk 270 that is also stored on the tape 204, the database file stored on the tape 204 becomes obsolete. Thus, the database application may write a reclamation catalog to the tape 204 indicating that the database file stored on the tape 204 is obsolete.

The server 202 also includes a reclamation process 208, described in detail below, that is used to reclaim storage space occupied by obsolete data on the tape 204. Briefly stated, the reclamation process 208 writes the files from the tape 204 to another tape (e.g., a destination tape, not shown) but does not write the files specified in the reclamation catalog. As a result, the destination tape will include the files from the tape 204 that have not been identified as obsolete, and are therefore, presumably, still valid. The destination tape may then be used by the server 202 as the principal storage medium, and the existing tape 204 may be erased and reused.

According to another aspect of the present invention, if multiple versions of a file exist on the tape 204, the reclamation process 208 may write only one version of the file (e.g., omitting earlier versions) when copying to the destination tape. Because the reclamation process 208 may be time-consuming, it is preferably performed offline. The reclamation process 208 may be included as one subsystem in the operating system of the server 202. This allows the operating system 35 to perform the reclamation process for multiple unique applications rather than requiring each application to perform its own reclamation processing or requiring the applications to coordinate the reclamation processing among themselves.

Figure 3:
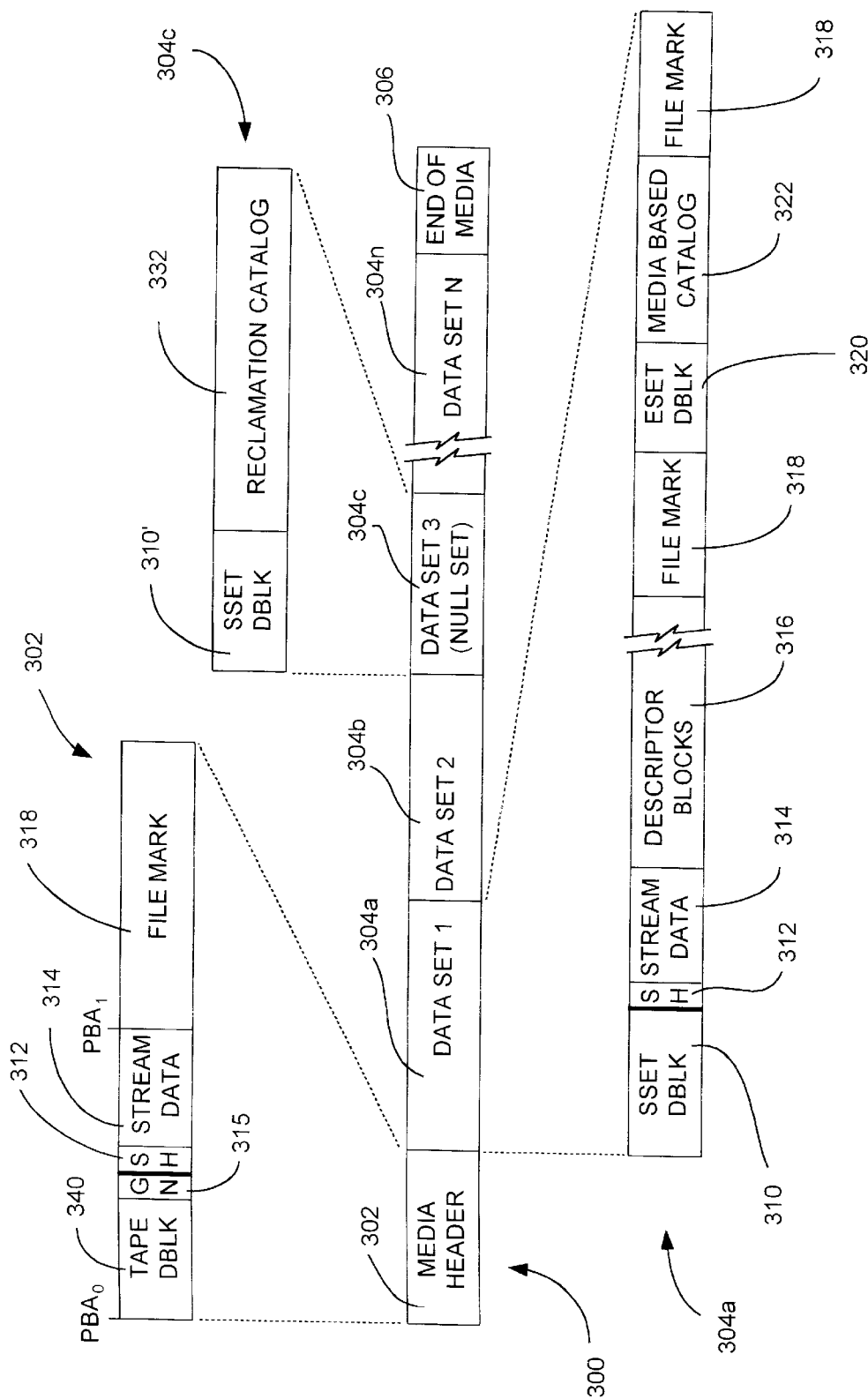
FIG. 3 is a graphical representation of a tape format used by the illustrative storage management system implementing the present invention.

FIG. 3 is a graphical representation of one tape format used in accordance with the present invention. The tape format 300 may be based on and extend the Microsoft Tape Format (MTF) Specification, Version 1.00a, (hereinafter referred to as the MTF which is hereby incorporated by reference. Although the present invention is described with general reference to the MTF, it will be appreciated that the teachings of the present invention have broad applicability and other storage formats may benefit equally from the present invention.

Before continuing, it is helpful to define some terms that will be used in the following discussion. First, a "data set" is a collection of objects written to a removable storage media during a data management operation (e.g., a backup, transfer or copy operation). A "media family" is a collection of one or more appended data sets that span one or more individual tapes or media. A "descriptor block" (DBLK) is a variable length block of data used for format control which is aligned on a format logical boundary. A "data stream" is aligned on a stream alignment factor and includes a stream header and stream data that are associated with a DBLK. A "filemark" is aligned on a physical block boundary and provides a logical separation and fast positioning within a media. A "physical block address" (PBA) is an address identifying a minimum number of bytes which can be written to the removable storage medium. A "format logical address" (FLA) is a zero based index into a data set based on a size of 512 or 1024 bytes.

Returning to FIG. 3, the tape format 300 includes a media header 302, one or more sequential data sets 304a–n, and an end-of-media mark 306. The data sets 304a–n may include a start of dataset descriptor (SSET DBLK) 310 containing information describing the data set, such as a name, a user description, a password, a sequence number, a date and time at which data began being written to media, and a type of data management operation (e.g., transfer, copy, normal backup, differential backup, etc.) used to create the data set. In addition, data sets 304a–n may each include a stream header 312 and stream data 314 for padding to a next format logical address (FLA). One or more descriptor blocks 316 and associated data are written behind the stream data 314, and are followed by a filemark 318.

Data sets 304a–n may further include an end of set descriptor block (ESET DBLK) 320 indicating that the preceding filemark 318 is the end of the data set. The ESET DBLK 320 includes information which is not available until after the data management operation completes, such as a number of corrupt objects written to the media. As described in the MTF, data sets 304a–n may optionally include a media based catalog 322 followed by another filemark 318. The MTF provides for two Media Based Catalog types, "Type 1" and "Type 2," both of which describe the data stored on the tape media.

Figure 6:
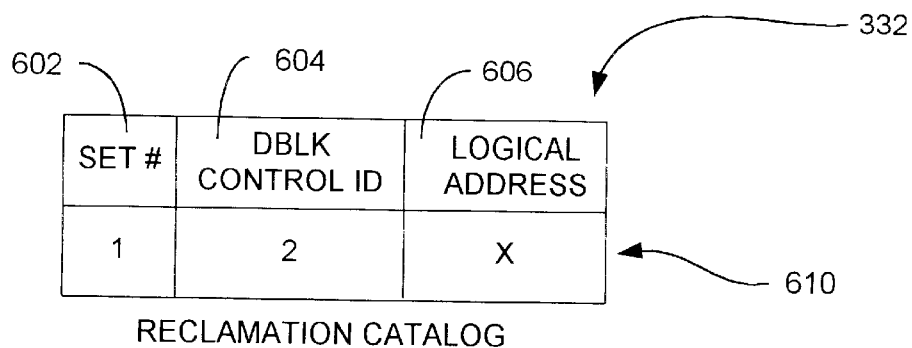
FIG. 6 is a graphical representation of one embodiment of a reclamation catalog that describes data objects stored on a storage media and which are deemed obsolete.

In accordance with one aspect of the invention, a new catalog type, a reclamation catalog 332, is provided that identifies the obsolete data stored on the tape media. The structure of the reclamation catalog 332 is illustrated in FIG. 6 and described in detail below. Briefly described, the reclamation catalog 332 includes a record for each obsolete file on the tape 204. The record identifies the location on the tape 204 of the obsolete file. If necessary to conform with tape storage conventions, the reclamation catalog 332 may be written to the tape media as part of a null data set 304c. In addition to the reclamation catalog 332, the null data set 304c includes the SSET DBLK 310' which indicates to a tape reader the beginning of a data set.

In accordance with another aspect of the invention, the media header 302 may optionally include a generation number 315. The generation number 315 allows an application to determine whether a reclamation process has occurred since its last access to the tape media. In that way, the application may easily identify whether the arrangement of the data sets and data blocks on the tape 204 is the same as it was during the last access of the tape media. This feature is helpful in the situation where an application 209 maintains its own listing of data sets and data blocks on the tape to avoid the performance burden of retrieving that information from tape for each tape access. The application may determine whether to use its current listing or to update its listing by comparing the generation number stored in the media header 302 during a current tape access with a generation number read during the previous tape access. The use of the generation number in the reclamation process will be further described below.

Figure 4:
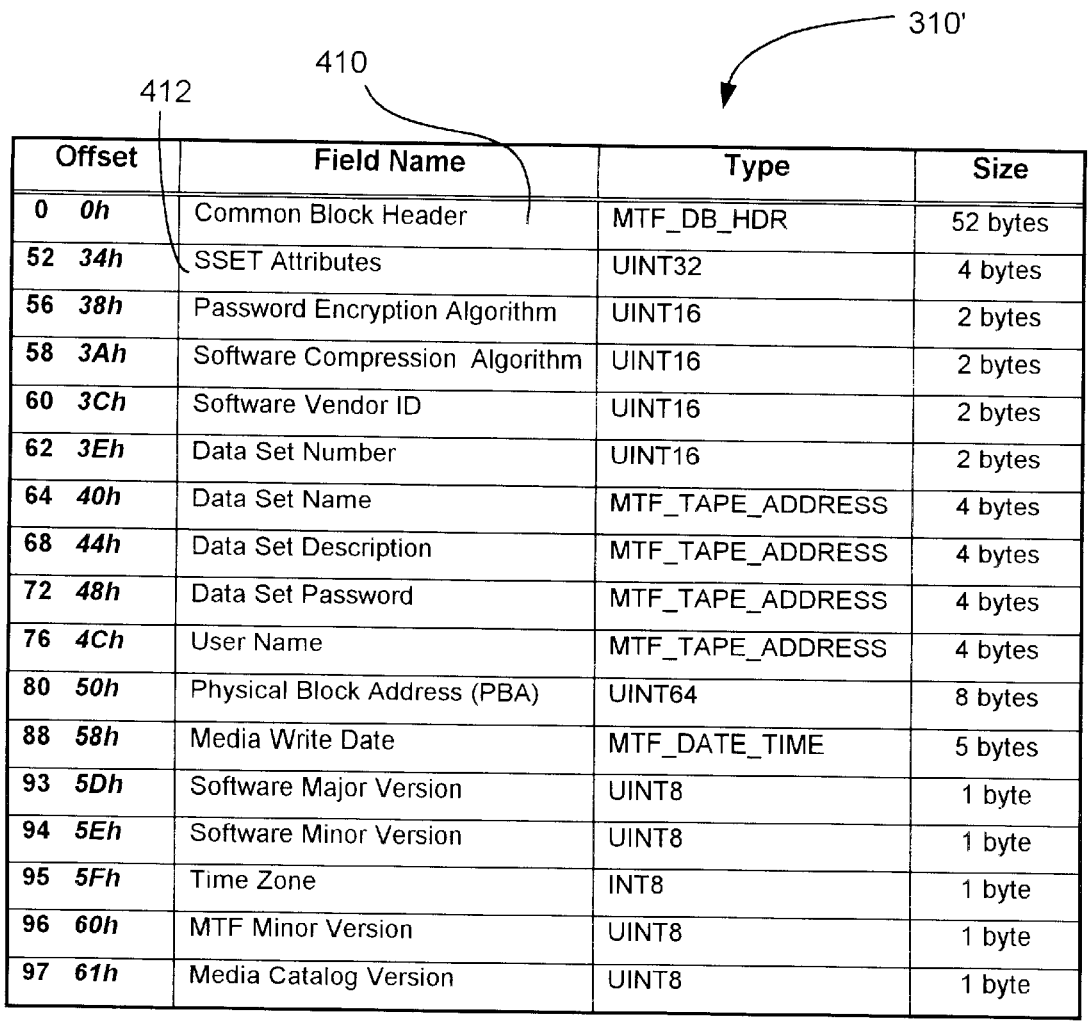
FIG. 4 is a table representing a start of set descriptor block used by the illustrative storage management system implementing the present invention.

FIGS. 4 and 5 illustrate one embodiment of the SSET DBLK 310' of the present invention. As shown in FIG. 4, the SSET DBLK 310' includes fields described in the MTF for typical SSET DBLKs 310. A first field 410 in the SSET DBLK 310' identifies a common block header, which is shown in detail in FIG. 5. The common block header 500 (FIG. 5) includes a DBLK Type field 502. In accordance with one aspect of the present invention, a null data set identifier is written into the DBLK Type field 502 to indicate that the data set is the null data set 304c. This identifier is then used during the reclamation process to locate the obsolete data objects, as will be described in detail below with reference to FIG. 10. Alternatively, the null data set identifier may be written to one or more other fields in the SSET DBLK 310', such as to the SSET Attributes field 412 (FIG. 4).

Continuing with FIG. 5, each descriptor block in a data set has a Control Block ID 504 in the common block header 500. SSET DBLKs have a Control Block ID value of zero (indicating that the SSET DBLK is the first in a series of DBLKs), and subsequent DBLKs within the data set have a Control Block ID one greater than the previous DBLK's Control Block ID. Thus, values for this field are only defined for DBLKs within a data set from the SSET to the last DBLK occurring prior to the ESET.

FIG. 6 is a graphical representation of one embodiment of a reclamation catalog, such as the reclamation catalog 332 shown generally in FIG. 3. The reclamation catalog 332 includes the information necessary to identify obsolete data objects on tape media, thereby enabling the reclamation of the storage space occupied by those obsolete data objects. For instance, the reclamation catalog 332 includes an identifier 602 for the data set within which an obsolete data object resides, and a Control Block ID 604 identifying the descriptor block associated with the obsolete data object within the data set. As mentioned earlier, a data object refers to a file or other data that has been written to the tape media.

The reclamation catalog 332 also optionally includes a logical address 606 identifying where in the data set the obsolete data object resides. As described in the MTF, the logical address is a number of logical blocks from the start of the data set. The logical address can be thought of as a zero-based index into the data set. Every DBLK found in a data set has a unique logical address that is stored in the Common Block Header structure of the DBLK itself, as shown in field 506 of FIG. 5. The reclamation process 208 (FIG. 2) may, alternatively, use the logical address in conjunction with the PBA of the SSET to calculate and seek to the exact location of the desired object's DBLK.

Figure 7:
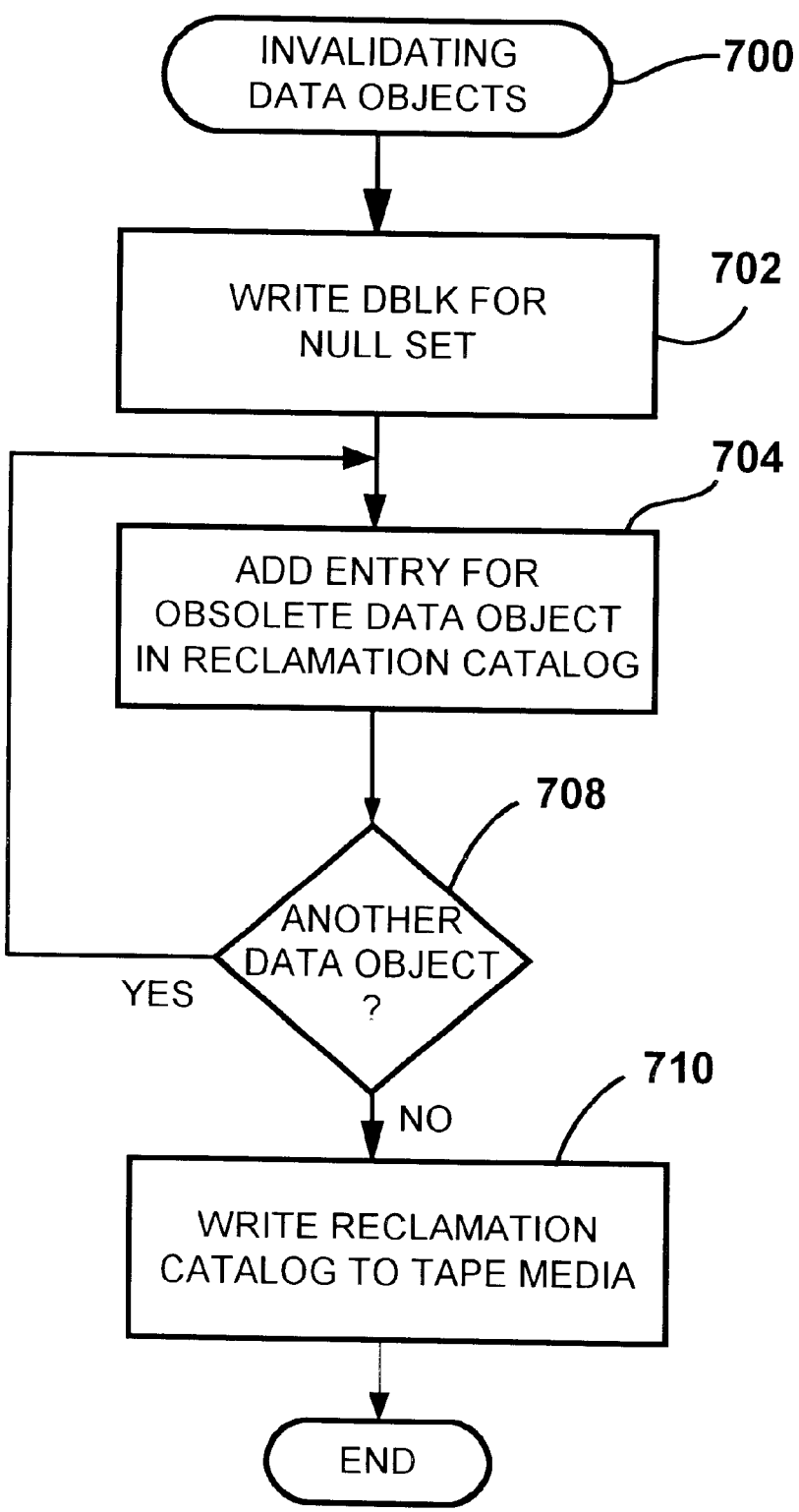
FIG. 7 is a logical flow diagram which generally describes a process performed by the illustrative storage management system to identify data objects on the tape media as obsolete in accordance with one implementation of the present invention.
Figure 8:
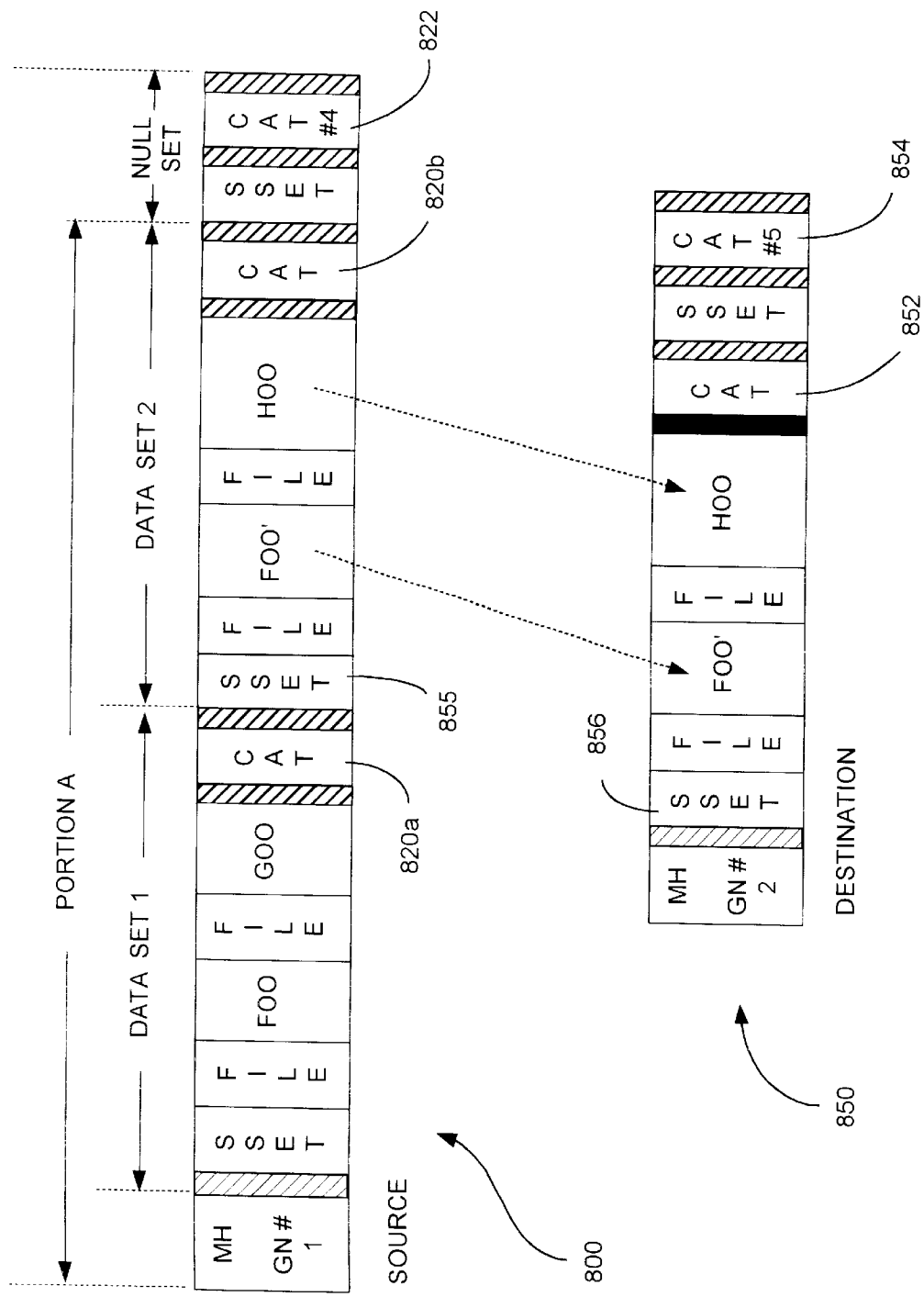
FIG. 8 is a graphical representation of a tape format used by the illustrative storage management system implementing the processes illustrated in FIGS. 7, 10A, 10B, and 11.

FIG. 7 is a logical flow diagram which, in conjunction with FIG. 8, generally describes a process performed by the illustrative storage management system to identify data objects on the tape media as obsolete. The following discussion refers to a hypothetical database application to describe the operation of the storage management system. In one tape management session, the database application wrote database files FOO and GOO to a source tape 800 (as illustrated in FIG. 8). The database application then updated, on hard disk 270, one existing database file (FOO now FOO') and created a new database (HOO) that replaces GOO. The database application then wrote, in a subsequent tape management session, its currently-valid files (FOO' and HOO) to the source tape 800 in accordance with the MTF specification. At that point, source tape 800 includes the database files (identified as portion A) from both tape management sessions, but the database file FOO and the database file GOO (from the previous tape management session) are both obsolete.

At start block 700, after the database application has determined that its application specific metadata has the same generation number as the tape (e.g., source tape 800), the database application writes a null data descriptor block (DBLK) to the tape (block 702). The descriptor block may be the SSET DBLK 310' (described above), which includes an indicator that the DBLK is a null set type.

At block 704, after writing the DBLK, the database application begins building a reclamation catalog by writing an entry to identify one data object determined to be obsolete (e.g., database file GOO). For example, referring to the illustration in FIG. 6, an entry 610 in the reclamation catalog may specify that the database file GOO is obsolete. Thus, entry 610 has a value 1 for the set number identifier 602, which represents that GOO is in the first data set (Data Set 1 in FIG. 8). In addition, entry 610 has a value of 2 for the Control Block ID 604, which represents that GOO is in the second descriptor block in the data set.

At decision block 708 (after the entry for the data object is added to the reclamation catalog), the application determines whether there are any other data objects to mark as obsolete. If so, the application loops back to block 704 and adds another entry to the reclamation catalog. Once all the obsolete data objects have been added to the reclamation catalog, the logic proceeds to block 710, where the reclamation catalog is written to the tape media (as "Cat #4" 822 in FIG. 8) and processing ends. At this point, the tape media appears as the source tape 800 shown in FIG. 8.

Figure 10A:
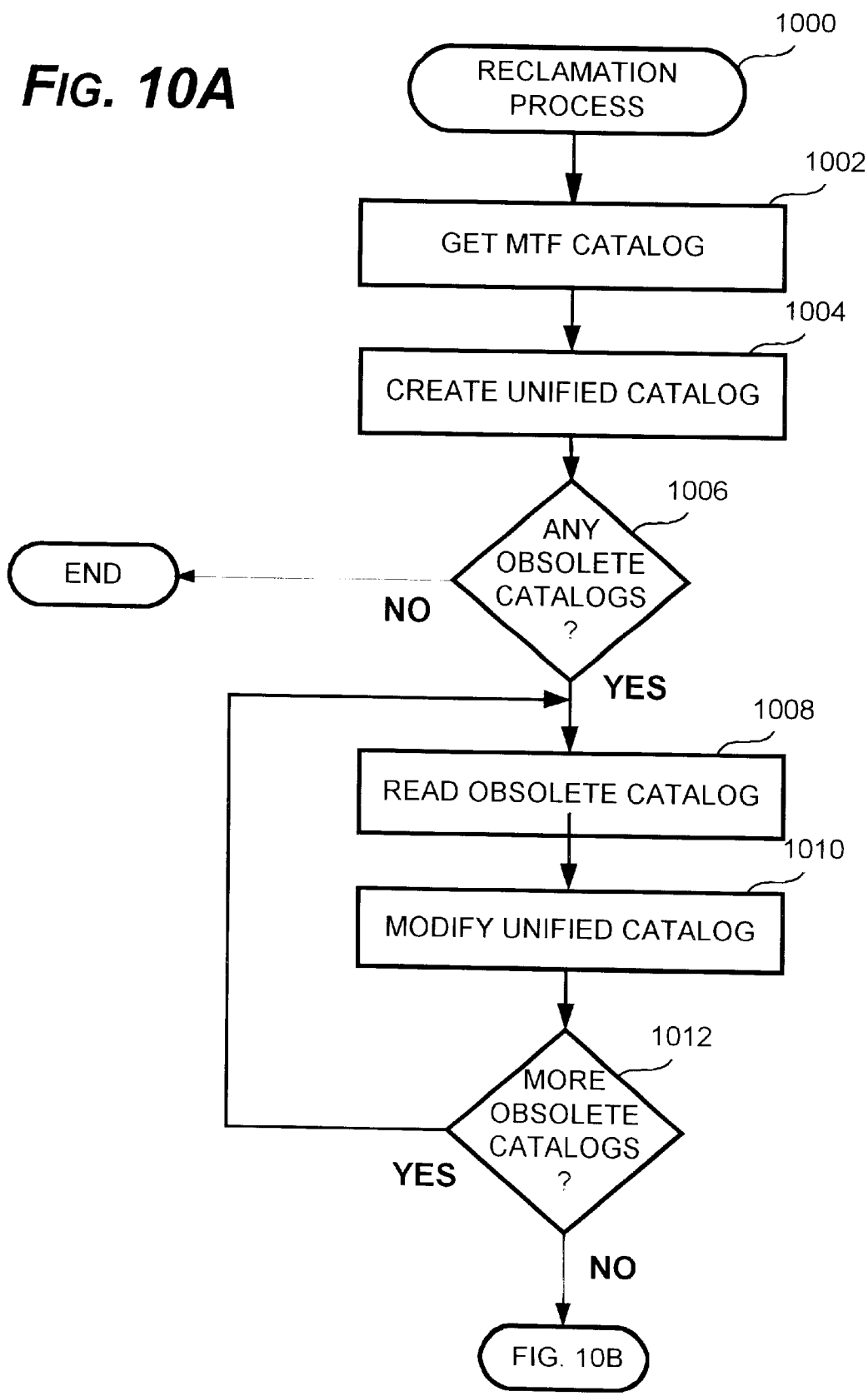
FIGS. 10A and 10B are logical flow diagrams which generally illustrate an illustrative process for reclaiming storage space occupied by obsolete data blocks on a sequential storage media in accordance with one implementation of the present invention.
Figure 10B:
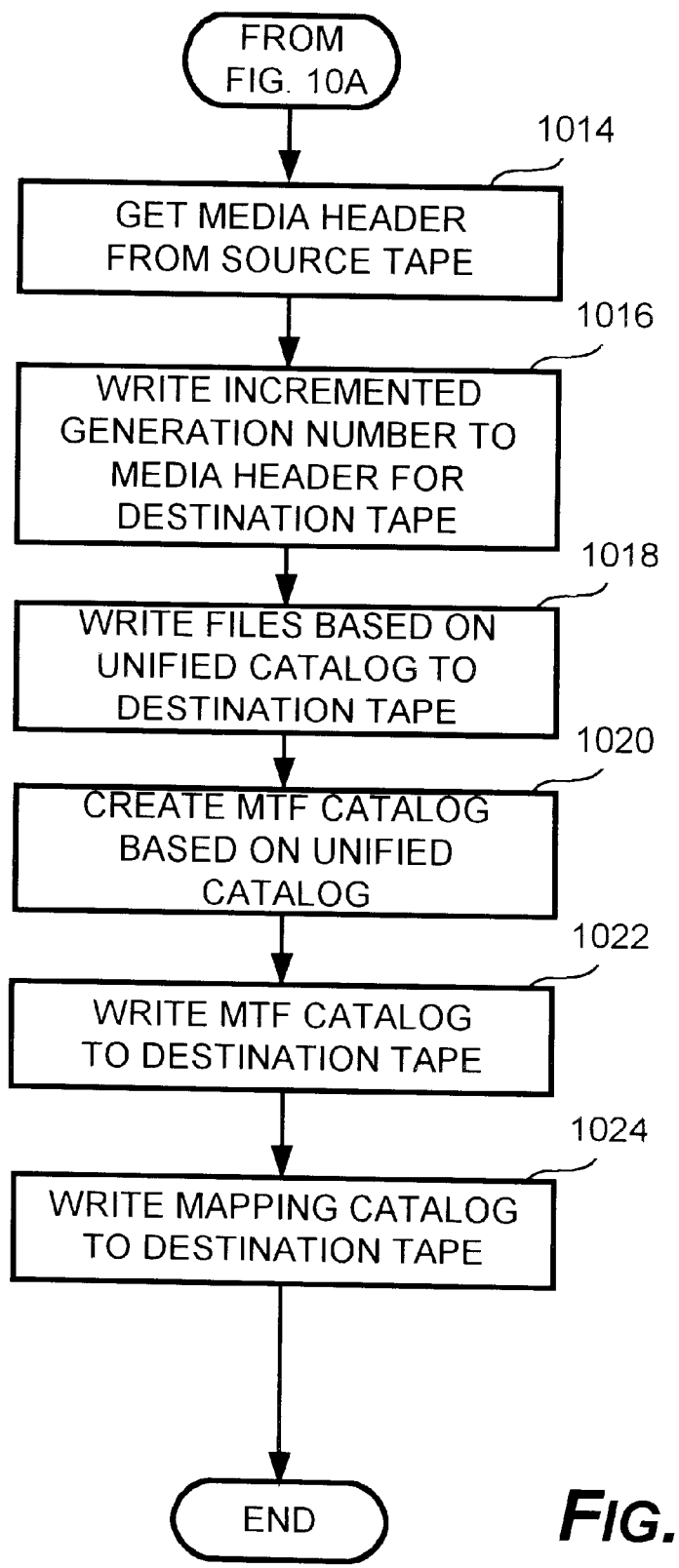

FIGS. 10A and 10B are logical flow diagrams which, in conjunction with FIG. 8, generally illustrate an exemplary reclamation process using the example database application introduced above. When at least one reclamation catalog (e.g., reclamation catalog 822) has been written to the tape media, the reclamation process may reclaim the storage space occupied by those obsolete data objects identified in the reclamation catalog. The reclamation process begins at block 1000 and proceeds to block 1002 where an MTF catalog is retrieved from the tape media. As described earlier, the MTF catalog describes each file that has been stored on the tape media. In the database application example, the catalog 820b may be read from the source tape 800.

As will be appreciated by those familiar with MTF, the MTF catalog is optional, and may not exist on the tape media. In that case, the reclamation process may create an MTF catalog by scanning and reading the entire tape media. While creating an MTF catalog is considerably slower than using an existing MTF catalog, it allows the present invention to operate with any media conforming to the MTF specification. After getting the MTF catalog, the logic proceeds to block 1004.

At block 1004, the reclamation process begins creating a unified catalog by writing the information from the MTF catalog 820b to the unified catalog. At this point, the unified catalog and the MTF catalog have similar information. Thus, entries in the unified catalog exist for each data object described in the MTF catalog 820b. For example, the unified catalog presently includes an entry for the database file GOO from the MTF catalog 820b. The process then proceeds to decision block 1006.

At decision block 1006, a determination is made whether there are any reclamation catalogs on the tape media. The process determines this by scanning through the data sets searching for any data sets having the DBLK type specified as a null set type. Alternatively, a field in the reclamation catalog 822 may identify it as that type of catalog. If no reclamation catalogs are found, the process ends and no destination tape is created. However, if a reclamation catalog is located, the process continues to block 1008.

At block 1008, the reclamation catalog is read from the tape media. Thus, in the database application example, the reclamation catalog 822 is read from the source tape 800. For each entry in the reclamation catalog, the unified catalog is modified, such as by deleting or marking the entries to indicate that the corresponding file should not be copied onto the destination tape 850 shown in FIG. 8. Continuing with the database example, the database file GOO is identified in the reclamation catalog 822, so the entry for GOO (created at block 1004) is deleted or marked as obsolete in the unified catalog. The process then proceeds to decision block 1012 where a determination is made whether there are any more reclamation catalogs. If there are, the process loops back to block 1008 and continues processing as described above. Once the reclamation process determines that all the reclamation catalogs have been read at decision block 1012, the process proceeds to block 1014 (FIG. 10B).

In another embodiment, the reclamation process further modifies the unified catalog by deleting or marking earlier versions of a file, thereby, keeping only the latest version of a file for later copying to the destination tape. As shown in FIG. 8, two versions of the file FOO have been written to the source tape 800. The first version (FOO) was written in Data Set 1, and the later version (FOO') was written in Data Set 2. Thus, in this embodiment, the reclamation process may delete the entry for the earlier version (FOO) from the unified catalog, or mark it as obsolete.

At block 1014, the reclamation process gets the media header from the source tape after rewinding the source tape. The reclamation process may increment the generation number located in the media header so that later applications will be alerted that a reclamation process has been performed. The updated media header is then written at the beginning of the destination tape at block 1016. It should again be noted that the use of the generation number is an enhancement to the storage management system, and is not necessary to a proper functioning of the invention.

At block 1018, after writing the media header and any other information conforming to the MTF specification (e.g., an SSET DBLK), the reclamation process writes each file that is not marked as obsolete in the unified catalog to the destination tape 850. The reclamation process also creates an MTF catalog, such as a Type 1 or Type 2 catalog, based on the unified catalog at block 1020. This MTF catalog is then written to the destination tape at block 1022. Preferably, the MTF catalog describes the files written to the destination tape as one data set. The process then proceeds to block 1024.

Figure 9:
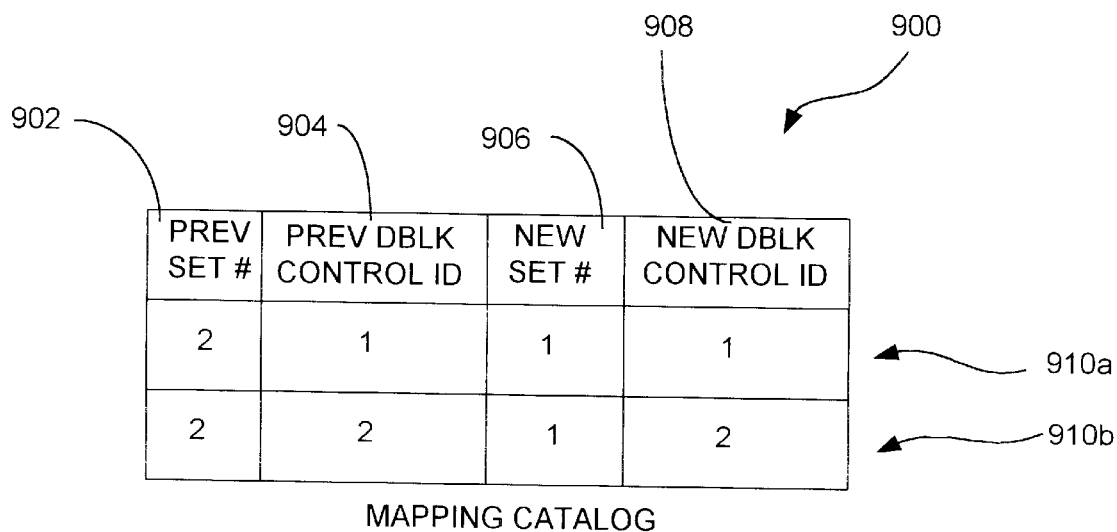
FIG. 9 is a graphical representation of one embodiment of a mapping catalog that maps data objects stored on a destination media to the previous location of those data objects stored on a source media, in accordance with one aspect of the present invention.

At block 1024, in accordance with another aspect of the present invention, a mapping catalog is written to the destination tape and the reclamation process ends. The mapping catalog is illustrated in FIG. 9 and described below. Briefly described, the mapping catalog includes mapping pairs of data objects as they existed on the source tape 800 and as they now exist on the destination tape 850.

FIG. 9 is a graphical representation of one embodiment of a mapping catalog 900. As mentioned earlier, an application that takes advantage of the tape storage system may maintain its own application specific metadata describing the storage of information on the tape media. After reclamation as described above, the application specific metadata maintained by the application may become invalid. To address that situation, the reclamation process may write a mapping catalog 900 to the destination tape.

The mapping catalog 900 includes a previous set number field 902, a previous DBLK Control ID field 904, a new set number field 906, and a new DBLK Control ID field 908. The previous set number field 902 is used to specify the set number of the data object on the source tape, and the previous DBLK Control ID field 904 is used to specify a unique DBLK Control ID as explained above with reference to FIG. 5. For each entry 910, the application locates the previous set number field 902 and previous DBLK Control ID field 904 in its application specific metadata and replaces those fields with the corresponding value in the new set number field 906 and the new DBLK Control ID field 908, respectively.

For the database application example, the mapping entry 910b illustrates the mapping of the HOO file to the destination tape 850. As shown in FIG. 8, HOO was the second DBLK after the SSET DBLK 855 in Data Set 2 on the source tape 800, but is now located in Data Set 1, in the second DBLK after the SSET DBLK 856 on the destination tape 850. Therefore, the HOO mapping entry 910b has a value of 2 and 2 for the previous identifier and the previous Control Block ID, respectively, and a value of 1 and 2 for the new identifier and the new Control Block ID, respectively. Once the application updates its application specific metadata, the application may then access the destination tape 850 to retrieve one or more of its files, or to write additional files to the tape as will be described now in detail with reference to FIG. 11.

Figure 11:
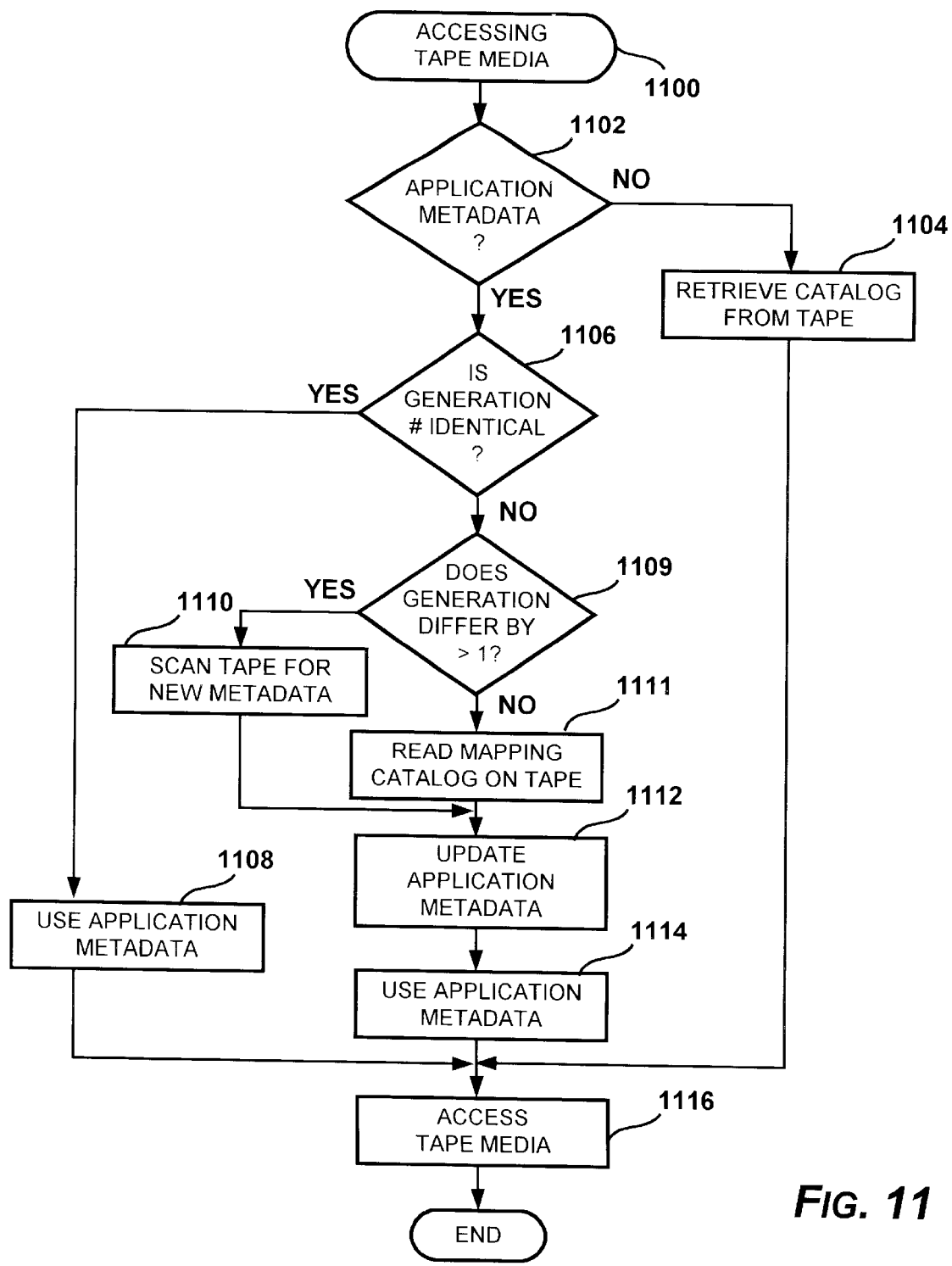
FIG. 11 is a logical flow diagram generally illustrating a process performed by an application program to access data stored on the destination tape, in accordance with one implementation of the present invention.

FIG. 11 is a logical flow diagram generally illustrating a process performed by the application to access data on the destination tape 850 in accordance with the present invention. The process performed by the application enters at starting block 1100, where the application begins to access tape media, such as to retrieve a file or write additional files.

At decision block 1102, a determination is made whether the application maintains its own application specific metadata describing the tape media. If the application does not maintain its own application specific metadata, the process continues to block 1104, where the application retrieves the catalog that exists on the tape media, and then accesses the tape media at block 1116. This may occur, for example, when a new application first uses the tape media. However, if the application does maintain its own specific metadata, processing proceeds to decision block 1106 from decision block 1102.

At decision block 1106, the application determines whether the generation number stored in its application specific metadata is the same as the generation number stored in the media header on the tape media. If the generation numbers are the same, the application uses its own application specific metadata (stored on hard disk 270) at block 1108 when accessing the tape media at block 1116. If, however, the generation numbers are not the same, the process proceeds to decision block 1109 from decision block 1106.

At decision block 1109, the application determines whether the generation numbers differ by more than one, indicating that more than one reclamation has occurred since the application last updated its metadata. If more than one reclamation has occurred since the last metadata update, then the mapping catalog on the tape media does not accurately reflect the changes that must be made to the application's metadata to describe the current state of the tape media. Thus, at block 1110, the application scans the tape media to rebuild its local metadata without the assistance of the mapping catalog. However, if the generation numbers do not differ by more than one, the process continues at block 1111.

At block 1111, the application reads the mapping catalog from the tape media and updates its own application specific metadata (block 1112) as described above. Once updated, the application uses its application specific metadata (block 1114) to access the tape media at block 1116. In this manner, the application may still use its more efficient application specific metadata when accessing the tape even though the data has been rearranged on the destination tape 850.

While the invention is susceptible to various modifications and alternative constructions, certain illustrated embodiments are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. An independent method for storing information on a storage media, the method comprising:
   identifying one or more data objects on the storage media as obsolete; and
   writing a catalog to the storage media containing entries which correspond to the one or more identified data objects.

2. The method of claim 1 wherein the entries in the catalog include an indicator identifying a data set in which the corresponding identified data object is written on the storage media.

3. The method of claim 1 wherein the entries in the catalog include a control identifier that identifies a relative position within a data set for the corresponding identified data object.

4. The method of claim 3 wherein the entries further include a logical address for identifying a position on the storage media at which the corresponding identified data object is written.

5. The method of claim 1 further comprising writing a null data set associated with the catalog.

6. The method of claim 1, further comprising reclaiming storage space used by obsolete data objects on the storage media by:
   reading from the storage media one or more data objects that are not identified as obsolete; and
   writing the one or more data objects that are not identified as obsolete to another storage media.

7. An independent method for reclaiming space occupied by one or more data objects, the method comprising:
   obtaining a first catalog identifying a plurality of data objects stored on a source storage media;
   creating a unified catalog based on the first catalog;
   reading a reclamation catalog containing one or more entries that identify obsolete data objects;
   modifying the unified catalog in accordance with the reclamation catalog such that the unified catalog excludes the obsolete data objects;
   copying data objects not excluded in the unified catalog from the storage media to a destination storage media; and
   writing to the destination storage media a second catalog identifying the data objects written to the destination storage media.

8. The method of claim 7 further comprising writing a mapping catalog to the destination storage media that correlates the data objects on the destination storage media with a corresponding data object on the source storage media.

9. The method of claim 8 wherein the mapping catalog comprises:
   a previous indicator identifying the data set in which the data object is written on the source storage media;
   a previous control identifier which identifies a relative position within the data set for the data object;
   a new indicator identifying the data set in which the data object is written on the destination storage media; and
   a new control identifier which identifies a relative position within the data set for the data object.

10. A computer-readable medium having computer executable instructions for performing the method of claim 7.

11. A computer-readable medium having a plurality of data structures sequentially stored thereon, comprising:
   a first data structure in the plurality of data structures including a plurality of data objects; and
   a second data structure in the plurality of data structures, including:
      a first data field identifying the first data structure, and
      a second data field identifying an obsolete data object in the first data structure;
   such that when data in the second data structure is processed, the identity of the first data structure is determinable from the first data field of the second data structure, and the obsolete data object is determinable from the second data field of the second data structure.

12. The computer-readable medium of claim 11, wherein the second data structure further includes a logical address identifying the location of the obsolete data object within the first data structure.

13. The computer-readable medium of claim 11, wherein the first data structure comprises a data set on a sequential storage medium, and the first data field comprises an identifier for the data set.

14. The computer-readable medium of claim 11, wherein each data object in the plurality of data objects is associated with a corresponding descriptor block, and wherein the second data field comprises a control identifier for the descriptor block.

15. A storage management system, comprising:
   a storage media;
   a storage process configured to access information stored on the storage media; and
   a reclamation process configured to reclaim space occupied by one or more obsolete data objects,
   wherein the storage process writes a reclamation catalog to the storage media identifying at least one of the one or more obsolete data objects.

16. The storage management system of claim 15, wherein the reclamation process is included as part of an operating system associated with the server.

17. The system of claim 15, wherein the reclamation process is further configured to read information from the storage media and write the information to another storage media while excluding from the other storage media the obsolete data objects identified in the reclamation catalog.

18. The computer-readable medium of claim 17, wherein the reclamation process is still further configured to write a new catalog to the other storage media that defines a relationship between the information stored on the storage media and the information stored on the other storage media.

19. The computer-readable medium of claim 18, wherein the storage process is further configured to write a generation number to the other storage media.

20. A computer-readable medium having a data structure stored thereon, comprising:
   a plurality of data objects within the data structure, at least one of the data objects representing information contained within a data file, and another of the data objects representing a catalog of the data objects within the plurality of data objects; and
   a header field within the data structure, wherein the header field includes a generation number indicating whether a reclamation process has been performed on the data structure,
   such that when data in the data structure is processed, the generation number is read to determine whether other data needs to be updated with at least one of the plurality of data objects of the data structure.

21. A computer-implemented method for maintaining information about a storage media, the method comprising:
   reading a generation number stored in association with the storage media, the storage media including a catalog describing contents of the storage media;
   determining whether the generation number is consistent with a version of the catalog stored separate from the storage media; and
   if the generation number is inconsistent with the version of the catalog stored separate from the storage media, obtaining the catalog from the storage media.

22. The computer-implemented method of claim 21, wherein obtaining the catalog from the storage media further comprises updating the version of the catalog stored separate from the storage media with the catalog read from the storage media.

23. An independent method for reclaiming space occupied by one or more data objects, the method comprising:
   obtaining a first catalog identifying a plurality of data objects stored on a source storage media;
   creating a unified catalog based on the first catalog;
   reading a reclamation catalog containing one or more entries that identify obsolete data objects;
   modifying the unified catalog in accordance with the reclamation catalog such that the unified catalog excludes the obsolete data objects;
   copying data objects not excluded in the unified catalog from the storage media to a destination storage media;
   writing to the destination storage media a second catalog identifying the data objects written to the destination storage media;
   writing a mapping catalog to the destination storage media that correlates the data objects on the destination storage media with a corresponding data object on the source storage media; and
   writing a generation number to the destination storage media.

24. The method of claim 23, further comprising:
   comparing the generation number written to the destination storage media with a reference generation number stored in association with a local copy of metadata describing the plurality of data objects stored on the source storage media, and if the generation number differs from the reference generation number by a fixed value, updating the metadata with the mapping catalog to identify the data objects written to the destination storage media.

25. The method of claim 24, further comprising, if the generation number differs from the reference generation number by other than the fixed value, updating the metadata to identify the data objects written to the destination storage media by scanning the destination storage media.

26. A storage management system, comprising:
   a storage media;
   a storage process configured to access information stored on the storage media and to write a generation number to the other storage media; and
   a reclamation process configured to reclaim space occupied by one or more obsolete data objects, to read information from the storage media and write the information to another storage media while excluding from the other storage media the obsolete data objects identified in the reclamation catalog, and to write a new catalog to the other storage media that defines a relationship between the information stored on the storage media and the information stored on the other storage media
   wherein the storage process writes a reclamation catalog to the storage media identifying at least one of the one or more obsolete data objects, and
   wherein an application associated with the storage management system is configured to update an application specific catalog based on information in the new catalog if the generation number of the other storage media is inconsistent with the application specific catalog.

* * * * *